Oct. 15, 1940.   W. W. MOHUN   2,218,134
CONTROL HANDLE DEVICE
Filed Sept. 8, 1938
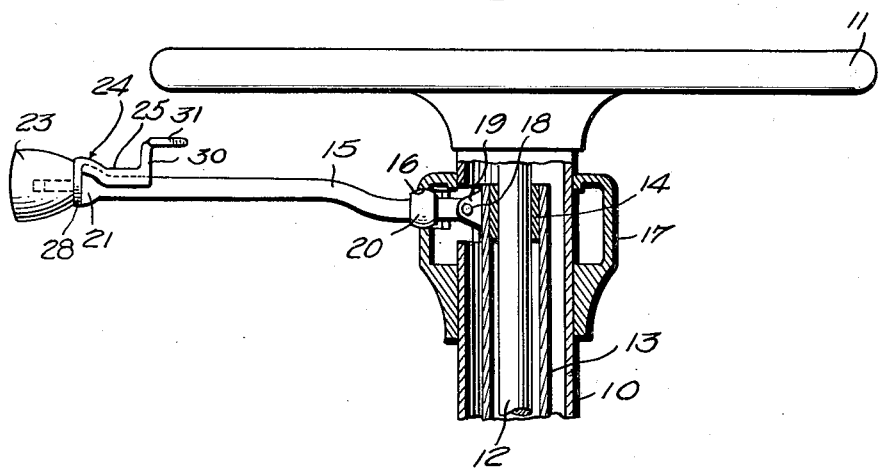
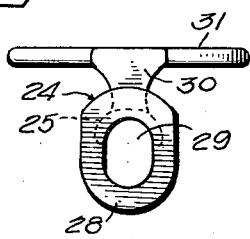
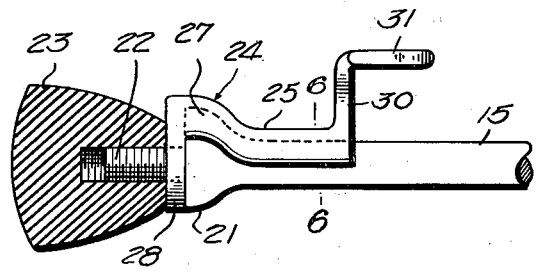
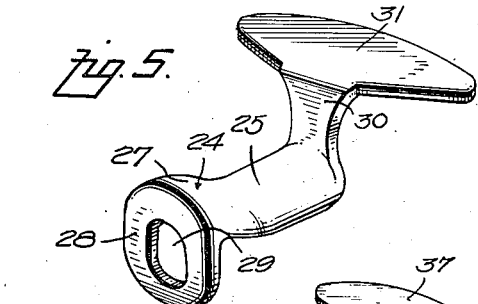
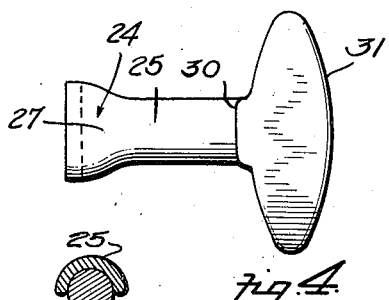
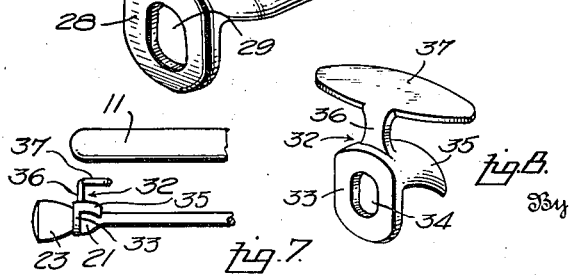
Inventor
WILLIAM W. MOHUN
By
Attorney Patented Oct. 15, 1940

2,218,134

UNITED STATES PATENT OFFICE 2,218,134

CONTROL HANDLE DEVICE

William W. Mohun, Detroit, Mich., assignor to Automatic Shifters, Inc., Richmond, Va., a corporation of Virginia Application September 8, 1938, Serial No. 229,012

5 Claims. (Cl. 74—484)

This invention relates to control handle devices, and more particularly to a handle device for use in connection with manually shiftable motor vehicle transmissions wherein the shift lever is mounted adjacent the steering wheel.

A number of motor vehicles are now equipped with gear shifting mechanisms wherein a lever is mounted adjacent the vehicle steering wheel and is operable for manually shifting the gears, such lever being movable toward and away from the steering wheel to two positions for determining the selection of either low or reverse gear, or second or high gear, the actual shifting operation being performed by moving the lever parallel to the plane of the steering wheel in either of the two selected planes of operation.

Such gear shifting mechanisms are advantageous over the older conventional arrangement of mounting a gear shift lever to project upwardly from the floor boards of the vehicle, the arrangement of the shift lever adjacent the steering wheel rendering the floor boards unobstructed and permitting the seating of three persons in the front seat of the vehicle. Such mechanism, however, is disadvantageous for the reason that the lever is not directly connected to the gear set but requires the transmission of movement thereto through a number of mechanical devices, thus increasing the amount of force necessary for the shifting operations. Moreover, in order to provide the desired leverage for each shifting operation it is necessary to move the shift lever through a substantial arc, and for reverse and second gear it is necessary to move the lever a substantial distance around the front of the steering wheel, which operation is rather awkward to perform.

Several types of power operated shifting mechanisms have been developed which are operable from a handle arranged adjacent the steering wheel and movable to the same relative positions as the manually shiftable lever referred to. Such a power operated shifting mechanism is highly advantageous for the reason that it requires very little force to operate the handle and for the additional reason that the travel of the handle may be so greatly reduced as to present no problems in its operation. A number of the manually shiftable mechanisms employing a lever adjacent the steering wheel are so constructed as to facilitate the substitution of power means in the connections between the shift lever and the transmission, but they do not facilitate any changing of the manual lever and its connection with the steering column, although the power shiftable mechanisms can be operated by the same lever as is employed for manual shifting.

In the copending application of Henry W. Hey, Serial No. 196,084 filed March 15, 1938, there is shown and described a manually operable handle which is particularly adapted for use in controlling the operation of a power shifting mechanism. Such handle comprises a hand-engageable portion arranged in such a position with respect to the steering wheel as to permit the operator to perform all shifting operations without the necessity for having to remove his hand from the steering wheel. The device is so constructed and arranged as to permit each shifting operation to be performed with one or two of the operator's fingers, it being unnecessary for the operator to remove his hand from the steering wheel and grasp the handle with his hand to move it to its different positions. Such a handle has been found highly advantageous in use, particularly in original factory installations, but its use is not particularly recommended as a replacement for a manually shiftable lever because of the difficulties and the amount of time involved in making the substitution of such a handle for the levers of the manually shiftable mechanisms.

An important object of the present invention is to provide an attachment for a lever of the type provided for manually shifting whereby a power shifting means may be employed with the mechanism and all of the advantages of the handle disclosed in the copending application referred to may be secured without the trouble and expense incident to the replacing of the lever.

A further object is to provide an attachment for a manually shiftable lever which permits the operator to perform each shifting operation with one or two fingers without removing his hand from the steering wheel.

A further object is to provide an attachment of the character referred to wherein one or two fingers of the operator may be employed for readily lifting the lever toward the steering wheel in order to select low gear for operation, followed by the equally simple subsequent shifting from first gear into second gear and then into high gear.

A further object is to provide a novel combination of the attachment referred to with the manually operable lever whereby a portion of the attachment may be engaged by one or two fingers of the operator to select low or reverse gear for operation, followed by the engaging of the fingers of the operator with the attachment or an adjacent portion of the lever to effect the desired gear shifting movement.

A further object is to provide such a combination wherein the knob ordinarily employed on the end of the manually operable lever may be employed as the sole means for securing the attachment to the lever.

A further object is to provide a combination of the character referred to wherein the attachment, at a point spaced from its point of connection with the lever, is shaped to coincide in cross-sectional shape with the lever to fit the latter and prevent any lateral movement of the attachment with respect to the lever.

Other objects and advantages of the invention will become apparent during the course of the following description.

In the drawing I have shown one embodiment of the invention. In this showing:

Figure 1 is a side elevation of the steering wheel of a motor vehicle and associated parts showing the invention applied, parts being shown in section, Figure 2 is an end elevation of the attachment, Figure 3 is a side elevation of the same shown attached to the outer end of the shift lever, Figure 4 is a plan view of the attachment, Figure 5 is a perspective view of the same, Figure 6 is a detail section on line 6—6 of Figure 3, Figure 7 is a fragmentary side elevation of a modified form of the invention, and Figure 8 is a detail perspective view of the modified device.

Referring to Figure 1, the numeral 10 designates the usual steering column surmounted by a steering wheel 11 connected to effect the steering of the vehicle through a conventional steering post 12. The present invention contemplates the provision of an attachment to be used with a manually shiftable transmission which forms no part of the present invention and accordingly need not be illustrated and described except as to those portions of the mechanism with which the present invention is associated. It will become apparent that the present invention is not limited to any particular type of manually shiftable transmission mechanism.

In the type of mechanism in connection with which the present invention is illustrated, a sleeve 13 is arranged within the steering column and is provided at its upper end with a bearing 14 engaging the steering post, the lower end of the sleeve 13 being similarly supported by suitable means (not shown). The sleeve 13 is mounted to slide axially with respect to the steering column to perform the crossover or selecting operation and is adapted to turn on the axis of the steering post to effect the shifting movement into either gear position. The particular means for utilizing the two movements of the sleeve 13 is of no importance in connection with the present invention, as indicated above.

For the purpose of effecting the two movements of the sleeve 13, a lever 15 is arranged beneath the steering wheel and projects radially inwardly through an opening 16 formed in a housing 17 mounted adjacent the upper end of the steering column. The inner end of the lever is pivotally connected by a pivot pin 18 to the sleeve 13, the pin 18 being carried by ears 19 secured to the sleeve 13. The lever 15 carries a substantially spherical member 20 arranged in the opening 16, this opening being substantially equal in height to the diameter of the member 20 and being circumferentially elongated. Accordingly it will be apparent that movement of the outer end of the lever 15 toward and away from the steering wheel causes the inner end of the lever to effect axial movement of the sleeve 13, whereas turning movement of the outer end of the lever causes the inner end of the lever to turn the sleeve 13 on its axis to perform the desired shifting movements.

The outer end of the lever is upset or enlarged as at 21 and is provided with a reduced extended threaded stem 22. This stem is threaded into a knob 23 and the inner end of the knob normally engages the adjacent face of the enlarged end 21 to complete the gear shifting lever, the knob 23 being grasped by the hand of the operator in performing the various shifting operations. Because of the degree of swinging movement of the lever 15 in performing shifting movements and because of the force which must be exerted in performing the shifting movements, it will be apparent that manual shifting can be completed only by the operator releasing his hand from the steering wheel and grasping the knob 23 in his hand to perform the desired shifting operations.

The device forming the subject matter of the present invention is indicated as a whole by the numeral 24 and comprises a shank portion 25 which is channeled in cross-section as indicated by Figure 6. The shaft portion of the attachment fits over the outer end of the lever 15 and is curved upwardly as at 27 to accommodate the enlarged end 21.

The outer end of the shank portion 25 is turned downwardly as at 28 to form a portion engageable against the outer end of the shift lever and is provided with an opening 29 through which the threaded stem 22 extends. The opening 29 is vertically elongated to permit the placing of the body of the device in position over the lever 15, the head 21 requiring that the device be lifted above its normal position while being moved into position longitudinally of the lever 15 and while inserting the stem 22 through the opening 29. Opposite faces of the end 28 are flat to engage flat against the adjacent respective faces of the knob 23 and head 21. It will be apparent that when the knob is in the position shown in Figure 3, it secures the attachment in position and, in fact, forms the sole attaching means therefor.

At the inner end of the shank 25, the attachment turns upwardly as at 30 and terminates in a winged finger engaging portion 31 which is spaced from the lever 15, substantially parallel to the plane of the steering wheel and approximately beneath the rim thereof. It will be apparent that the winged portion 31 extends laterally on opposite sides of the lever 15.

In some larger motor vehicles having larger steering wheels the same shift lever 15 is employed and accordingly such lever does not extend materially beyond the steering wheel. The device shown in Figures 1 to 6 inclusive accordingly would place the finger engaging portion 31 radially inwardly too far for convenient operation. For such installations the device shown in Figures 7 and 8 may be employed. Referring to Figures 7 and 8, the attachment is indicated as a whole by the numeral 32 and comprises an end 33 provided with an opening 34 vertically elongated for the same purpose as the opening 29, as will become apparent. Above the end 33, the attachment is provided with an extension 35 shaped to correspond to the shape of the top portion of the head 21 to fit over the latter as shown in Figure 7.

Above the portion 35, the device is provided with a shank portion 36 terminating in a winged finger engaging portion 37 which may be shaped the same as the wing portion 31 previously described. It will be apparent that the portion 37 is elongated transversely of the lever 15 and its position with respect to the steering wheel is the same as the position of the wing 31 in the form of the invention previously described.

The operation of the form of the device shown in Figures 1 to 6 inclusive is as follows:

As previously stated, the present device is adapted to be used in combination with a lever of the type commonly arranged beneath the steering wheel of a vehicle for performing the manual shifting of the gears. Accordingly the lever 15 is relatively heavy in order to withstand the substantial forces transmitted thereto for performing manual shifting movements. Where a power operated mechanism is placed in the connection between the sleeve 13 and the gear set the handle of the copending application of Henry W. Hey, referred to above, may be employed to great advantage. Such handle is preferably of light design because of the limited forces which must be applied thereto to control the power shifting mechanism. Such device, however, is intended particularly for use in factory installed power shifting mechanisms, but where it is used to replace an already installed mechanism of the manually shiftable type, difficulties are involved because of the necessity for disassembling the elements at the upper end of the steering column to connect the handle to the sleeve 13 or other device employed for the same purpose in manually shiftable transmissions.

The present device is intended for use as an attachment for manual shift levers of the type shown, for example, in Figure 1. The device provides the same highly advantageous features of operation as the device of the copending application referred to and while it does not present a shifting lever which is as light and neat in appearance as that of the copending application, it may be readily attached in a few seconds time. It merely is necessary to unscrew the knob 23, place the attachment in the position shown in Figures 1 and 3, and then replace and tighten the knob. The knob forms the sole securing means for the device, thus eliminating the necessity for any separate attaching means. Movement of the attachment is positively prevented by the knob, but additional advantages in anchoring the device among other things is secured by forming the shank 25 to coincide in cross-sectional shape to the portions of the lever 15 which it engages. The channeled shape of the shank stiffens it against vertical flexing when the finger engaging portion 31 is lifted, and the engagement of the shank with the lever 15 positively prevents any lateral movement of the inner end of the attachment with respect to the lever 15, even if the knob 23 should become slightly loosened.

From the foregoing it will be apparent that the device is extremely simple in construction, being preferably made of a single piece of material, and that it may be very easily secured permanently in position on the lever. The device also greatly facilitates the controlling of a power shifting mechanism. Devices of this character usually have associated therewith means (not shown) for biasing the outer end of the lever 15 for movement away from the steering wheel, such means forming a conventional part of manually shiftable transmissions of this type. In such biased position the lever is movable back and forth from its neutral position in a plane parallel to the plane of the steering wheel to effect the shift into second or high gears, and when the handle is pulled toward the steering wheel it is placed on a plane in which it may be moved parallel to the steering wheel to shift into first or reverse gears.

When it is desired to shift into low gear, the operator, while allowing his thumb to remain hooked over the rim of the steering wheel, may engage one or two fingers beneath the finger engaging flange 31 and move the lever toward the steering wheel preparatory to the gear shifting movement. By a slight movement downwardly and rearwardly parallel to the plane of the steering wheel, the shift into low gear is initiated and it may be continued and completed by engagement of the fingers of the operator against one side of the lever 15 or against the side of the shank portion 25. The shift into second gear subsequently may be effected by engaging one finger against the opposite side of the lever 15 or shank 25 to move the lever toward neutral position at which point it will drop away from the steering wheel to the second and high gear plane, and further pressure of the operator's finger will move the lever into the second gear position. By exerting finger pressure against the other side of the lever 15 or shank 25, the shift may be made directly from second gear to high gear.

It will be apparent, therefore, that all shifting operations may be performed by engaging one or two fingers with the attachment without removing the hand from the steering wheel. With power shifting mechanism of the type referred to the maximum travel of the portion of the lever 15 beneath the rim of the steering wheel may be reduced very readily to 1¼ inches on each side of neutral positon, and accordingly every shifting movement may be easily performed by the operator rocking his hand with his thumb hooked over and supported by the steering wheel. In other words, all portions of the attachment which are to be engaged by the operator are sufficiently close to and are arranged in such a position with respect to the steering wheel as to permit the various shifting operations to be performed without removing the hand from the steering wheel.

While any desired shift may be made with one finger, the desired practice is to turn the ends of the index and middle fingers beneath the wing 31 on opposite sides of the upwardly extending shank portion 30. Without moving the fingers from such position and without removing the hand from the steering wheel, all shifting movements may be performed with the greatest facility.

The operation of the form of the invention shown in Figures 7 and 8 is identical with the form previously described and need not be referred to in detail. As is the preferred practice described above, the operator, without removing his hand from the steering wheel, may turn the ends of the index and middle fingers beneath the wing 37 on opposite sides of the shank 36 and may readily exert an upward force of the wing 38 or a lateral force against the shank 36 to perform any of the desired shifting operations. As is true of the opening 29, the opening 34 is vertically elongated to facilitate the slipping of the portion 35 over the head 21 while stem 22 is being inserted through the opening 34, the device, of course, being attached in the same manner as described above by first removing the knob 23.

It is to be understood that the form of the invention herewith shown and described is to be taken as a preferred example of the same and that various changes in the shape, size and arrangement of parts may be restorted to without departing from the spirit of the invention or the scope of the subjoined claims.

I claim:

1. In combination with a vehicle steering wheel having a control lever arranged beneath the steering wheel and mounted to partake of movement in two directions with respect to the steering wheel, said lever having its free end projecting radially outwardly beyond the steering wheel, a member arranged in contact with said lever and elongated in the direction of the length thereof, said member intermediate its ends being of a cross-sectional shape corresponding to the cross-sectional shape of the adjacent portions of said lever and engaging therewith to prevent lateral movement of said member relative to said lever, and means for detachably securing said member to said lever solely adjacent the free end of the latter, said member having a portion spaced inwardly from the free end of said lever and elongated transversely of the lever, said portion being arranged in such position with respect to the steering wheel as to permit access of the hand of the operator thereto without the operator having to remove his hand from the steering wheel.

2. In combination with a steering wheel having a control lever arranged beneath the steering wheel, said lever being mounted to partake of movement in two directions with respect to the steering wheel and having its free end projecting radially outwardly beyond the steering wheel, a member arranged in contact with said lever and elongated in the direction of the length thereof, and means for detachably securing said member to said lever at the outer end thereof, said member having a finger-engaging portion spaced inwardly from the free end of said lever and arranged between said lever and the steering wheel and approximately beneath the steering wheel, said finger engaging portion lying approximately parallel to the steering wheel and having wing-like projections extending on opposite sides of said lever, and being arranged sufficiently close to the steering wheel to permit engagement of the fingers of the operator therewith without the operator having to remove his hand from the steering wheel.

3. In combination with a steering wheel having a control lever arranged beneath the steering wheel, said lever being mounted to partake of movement in two directions with respect to the steering wheel and having its free end projecting radially outwardly beyond the steering wheel, a member arranged in contact with said lever and elongated in the direction of the length thereof, said member adjacent the free end of said lever having a downturned end overlying the free end of said lever, and a detachable connection having a portion extending through said downturned end and forming the sole means for securing said member to said lever, said member having a finger-engaging portion spaced inwardly from the free end of said lever and arranged in such position with respect to the steering wheel as to permit access of the fingers of the operator thereto without the operator having to remove his hand from the steering wheel, said finger engaging portion being elongated transversely of said lever.

4. In combination with a steering wheel having a control lever arranged beneath the steering wheel and mounted to partake of movement in two directions with respect to the steering wheel, said lever having an enlarged head portion at its outer end, a stem projecting therefrom and a handle carried by said stem, a member arranged in contact with said lever and having a portion elongated transverely thereof and arranged in such position with respect to the steering wheel as to permit access of the fingers of the operator thereto without the operator having to remove his hand from the steering wheel, said member having a portion shaped to fit over the head of said lever and having an attaching end adapted to lie between said head and said handle and provided with an opening for said stem.

5. An attachment for a manually operable lever comprising a member having an elongated portion intermediate its extremities and having one end turned at an angle to such elongated portion and provided with an opening adapted to receive an attaching element, said member, at the other end of the elongated portion thereof, extending at an angle thereto and terminating in an extremity forming a finger engaging portion offset from said elongated portion and substantially parallel thereto, said finger engaging portion being elongated in its own plane transversely of the direction of elongation of said elongated portion of said member.

WILLIAM W. MOHUN.